3,806,328
PROCESS FOR PRODUCING LIGHT-CONDUCTING GLASS FIBER

Motoaki Yoshida, and Mitsugi Yoshiyagawa, Takarazuka, Japan, assignors to Nippon Selfoc Kabushiki Kaisha, Tokyo, Japan
Filed Dec. 28, 1970, Ser. No. 101,969
Claims priority, application Japan, Dec. 30, 1969, 45/426
Int. Cl. C03c *15/00, 25/02*
U.S. Cl. 65—30   6 Claims

ABSTRACT OF THE DISCLOSURE

A glass fiber containing ions highly contributable to the refractive index therein is dipped in a bath of a molten substance containing ions less contributable to the refractive index, so that a mutual diffusion of ions is thereby caused, whereby a distribution of the refractive index in any cross section perpendicular to the optical axis of the glass fiber, such that the refractive index decreases progressively from a central value toward its periphery is obtained. According to the process and apparatus herein described, the process time is substantially shortened and continuous production of the glass fiber is made possible.

BACKGROUND OF THE INVENTION

This invention relates to a process and apparatus for producing a light-conducting glass structure wherein the refractive index is distributed in a manner to decrease continuously any cross section of the structure perpendicular to the optical axis thereof.

Recently intense research has been carried out in the field of light-communication employing laser light, particularly in the transmission paths therein. For instance, a focusing light-conducting fiber, as disclosed in a preprint S5-5, p. 70, published in the National Assembly of the Japan Electronic Communication Society in 1969, is provided, in at least a portion near the center thereof, with a distribution of refractive index in any cross sectional plane perpendicular to the optical axis of the fiber such that the index is proportional to the second power of the distance from the center. Such a focusing light-conductive fiber has the advantageous features of being almost completely free of external influences and being freely bent when flexibility of the fiber is required.

The basic process for producing this focusing light-conducting fiber is described in U.S. patent application Ser. No. 806,368, filed on Mar. 12, 1969. In accordance with this process, ion exchange is caused between the glass and a substance in a melted salt bath, or mutual diffusion of cations are effected between two kinds of glasses having different compositions so that a desired distribution of concentration of modifying oxides in the glass is obtained by the thermal diffusion of cations.

SUMMARY OF THE INVENTION

A principal object of the present invention is to provide a process for producing focusing light-conducting glass fibers which is an improvement over that disclosed in U.S. patent application Ser. No. 806,368, now abandoned in favor of continuation application Ser. No. 147,256, filed May 26, 1971, whereby the comparatively long period heretofore required for the mutual thermal diffusion of cations because of the comparatively low temperature is substantially shortened.

Another object of the present invention is to provide an improved process for producing focusing light-conducting glass fibers which can be carried out continuously.

Still another object of the present invention is to provide an improved process for producing light-conducting glass fibers wherein the steps for drawing and spinning the glass fiber and for causing mutual diffusion are combined into one step.

These and other objects of the present invention can be achieved by the provision of an improved process for producing light-conducting glass fibers wherein a glass fiber containing ions having a greater degree of contribution to the refractive index is dipped into a melted substance containing ions having a lesser contribution to the refractive index, whereby mutual thermal diffusion of ions contained in the glass fiber and in the melted substance in a salt bath is caused to occur, whereby there is produced a light-conducting glass fiber in which the refractive index in any cross sectional plane perpendicular to the axis of the glass fiber is so distributed that it decreases progressively from a value corresponding to the central axis, at least in a portion near the central axis of the glass fiber toward the periphery thereof. This invention affords an improvement in that the specific gravities of the glass and the molten substance are selected to be substantially equal, and the above mentioned mutual thermal diffusion of ions is carried out rapidly as deformation of the glass fiber, which would otherwise be caused by the softening thereof arising from the high temperature, is prevented.

According to the present invention in another aspect thereof, there is provided an improved apparatus for producing a focusing light-conducting fiber which comprises: spinning means for continuously spinning a glass fiber containing ions having a greater degree of contribution to the refractive idex; a bath of melted substance having a specific gravity substantially equal to that of the glass fiber and containing ions having a lesser contribution to the refractive index; means for continuously feeding the glass fiber spun by the spinning means into the above-mentioned bath; means for heating the bath to a high temperature such that, if the glass fiber were to be immersed in a molten medium of a different specific gravity, it would deform because of its softening; and means for continuously leading and conveying the glass fiber out of the bath after a mutual thermal diffusion between ions having a greater contribution to the refractive index and ions having a lesser contribution to the refractive index has been caused through the surface of the glass fiber.

The nature, principle, and utility of the invention will be better understood from the following detailed description of the invention when read together with the accompanying drawing.

BRIEF DESCRIPTION OF THE DRAWING

In the drawing, the single figure is a schematic view showing an embodiment of the present invention.

DETAILED DESCRIPTION OF THE INVENTION

It is widely known that the speed of the mutual diffusion of ions through the outer surface of a glass fiber when the glass fiber is dipped in a salt bath is increased into the case where monovalent cations are selected for the ions. However, when a distribution of refractive index sufficient for forming a required light-conductivity is desired, at least two kinds of cations, between which a greater difference of electron polarization coefficient per unit volume of glass exists, should be mutually diffused through the surface of the glass fiber. More specifically, it is particularly required that monovalent cations of, for instance Tl ions, which have a greater contribution to the refractive index, be contained in the glass, and the Tl ions are mutually diffused through the outer surface of the glass fiber together with at least one kind of cations, contained in the melted salt-bath and selected from, for instance, Li, Na, K, Rb, and Cs, having a low degree of contribution to the refractive index of the glass. This fact is also described in detail in the above stated U.S. patent application No. 806,368, filed on Mar. 12, 1969.

With the above described process, it is possible to obtain a parabolic distribution of refractive index satisfying the equation $$n = n_0(1 - ar^2)$$

in any cross-sectional plane perpendicular to the optical axis of the glass fiber, at least in a portion near the optical axis of the glass fiber, wherein $n$ is a refractive index at a position at a distance $r$ from the central axis, $n_0$ is the refractive index at a position corresponding to the optical axis, and $a$ is a constant. The glass fiber having the above described distribution of the refractive index is highly advantageous as a transmission path in laser-communication technique or as a lens-effect structure in optical or information-processing techniques. The glass fiber described in this invention is defined as a glass structure having a length which is greater than the diameter of the cross section.

It was found that an important factor defining the speed of the mutual thermal diffusion of ions between a glass structure and a molten salt bath was the diffusing speed of the ions through the internal portion of the glass, and this speed was greatly influenced by the viscosity of the glass. Since the viscosity of glass decreased exponentially with temperature rise of the glass, it might be considered that the mutual thermal diffusion of ions is accelerated exponentially with the temperature rise of the glass. In reality, however, when the temperature of the thermal diffusion is elevated in excess of the temperature at which the viscosity of the glass becomes $10^{10}$ poises, a gravitational force or buoyant force is applied to the glass fiber depending on the difference between the specific gravities of the glass fiber and the melted salt. Because the temperature is very near the softening temperature of the glass fiber, the diameter of the glass fiber tends to vary along its length (i.e., to taper), or the glass fiber floats around in the bath causing, whereby the light-conducting characteristic of the structure thus obtained is greatly impaired.

For instance, when a glass fiber, the composition, in mole percent, of which is 3.3% of $Tl_2O$, 17.0% of $Na_2O$, 9.4% of PbO, and 70.3% of $SiO_2$, is to be caused to aquire a focusing, light-conducting characteristic without causing a tapering or partial bending thereof, it is required that the treating temperature, when $KNO_3$ is employed as the treating salt, be maintained at a value less than 460° C. Furthermore, when the glass fiber is heat-treated at 460° C., a treating period of 400 hours is required for a glass fiber having a diameter of 1 mm., and a period of 100 hours is required for a glass fiber having a diameter of 0.5 mm., for obtaining a parabolic refractive index distribution at least in a portion of the glass fiber near the central axis thereof.

On the other hand, when the temperature of the heat treatment is elevated to 500° C. for the purpose of shortening the heat-treatment period, the required period for the glass fiber having a diameter of 0.5 mm. is shortened to 20 hours. In this case however, variation of the diameter per 1 m. length of the glass fiber is as high as 0.1 mm. or more, whereby the focusing characteristic of the light-conductive fiber is greatly impaired. The viscosity of the glass fiber at a temperature of 460° C. is found to be $10^{10}$ poises, or long $\eta = 10.0$ (where $\eta$ is the viscosity), and that of the glass fiber at a temperature of 500° C. is found to be log $\eta = 8.6$. Furthermore, the specific gravity of the glass fiber in an actual instance of the above described case was 3.5, and the specific gravity of the salt was 1.7, the difference being 1.8 between these two values.

The above mentioned variation of the diameter or bending of the glass fiber due to the high temperature can be obviated by preparing a molten salt having a specific gravity substantially equal to that of the glass fiber, whereby the light-conducting glass fiber, or more specifically a focusing, light-conducting glass fiber, having the above mentioned distribution of the refractive index can be produced in a far shorter period than that required in the conventional process because the mutual thermal diffusion of ions is much activated at the higher heat-treating temperature.

For the purpose of minimizing the required period of the heat treatment to the order of from one-tenth to one-hundredth or even from one-hundredth to one-thousandth, it is preferable that the difference of the specific gravity between the glass fiber and the molten salt be less than 0.4 and more preferably a difference of 0.2 or less than 0.2.

According to the invention, the heat-treating temperature can be elevated to a value at which the viscosity of the glass is decreased to $10^4$ poises, or even to a higher value, whereby a light-conducting glass fiber having no deformation can be produced in a remarkably shorter time.

The glass fiber employed in the process accordinng to the present invention contains ions, such as Tl thallium ions, having a greater degree of contribution to the formation of the refractive index.

Furthermore, for the molten substance used in the salt bath according to the present invention, a salt or an oxide containing at least one kind of ions selected from alkali-metal ions such as Li, Na, K, Rb, and Cs, having a lower degree of contribution to the refractive index in comparison with the ions contained in the glass fiber is selected. In ordinary cases, a salt mixture consisting of a salt of an alkali metal and another metal salt having a greater specific gravity than the first mentioned salt is employed, and, by adjusting the mixing ratio of these two salts the difference in the specific gravities of the glass fiber and the salt mixture is minimized.

For the abovementioned salt mixture, chlorides, sulfates, nitrates, and carbonates of alkali metals, alkaline earth metals, lead, and zinc are mixed. For instance, mixed salts consisting of $PbCl_2 + KCl$, $$PbCl_2 + KCl + ZnCl_2,$$

$PbCl_2 + LiCl, KCl + ZnCl_2,$ $$KCl + PbCl_2 + K_2SO_4 + PbSO_4, K_2SO_4 + PbSO_4,$$

$$K_2SO_4 + ZnSO_4, K_2SO_4 + Na_2SO_4 + ZnSO_4,$$

$$Na_2SO_4 + ZnSO_4, KNO_3 + BaNO_3,$$

and $KNO_3 + BaNO_3 + PbCl$ are suitable for this purpose.

Lead compounds and zinc compounds contribute much to the elevation of the specific gravity of the salt mixture. Barium sulfate and calcium carbonate also elevate the specific gravity. However, since the latter substances have a tendency to opacify or corrode the surface of the glass fiber, the lead and zinc compounds are preferable. Furthermore, since lead nitrate and lead carbonate among the lead compounds are easily decomposed at the heat treating temperature, the above mentioned lead sulfate and lead chloride are most suitable. Likewise, among the zinc compounds, zinc nitrate has an excessively low specific gravity, and zinc carbonate is easily decomposed at the heat-treating temperature, thus zinc sulfate and zinc chloride are found to be the most suitable. It was also found that potassium sulfate and sodium sulfate contribute much to the lowering of the melting point of the salt mixture acting as a supply source of ions less contributable to the refractive index.

Otherwise, even a single salt may also be employed instead of the above mentioned salt mixture, if the specific gravity thereof is suitably selected relative to that of the glass fiber. For instance, rubidium chloride has a specific gravity of about 2.7 at room temperature and a specific gravity of from 2.4 to 2.5 in a molten condition at a high temperature. On the other hand, a glass fiber having a composition, in wt. percent, of 56% of $SiO_2$, 20% of $Na_2O$, 10% of $Tl_2O$, 11% of $K_2O$, 1% of $Al_2O_3$, and 2% of MgO has a specific gravity of about 2.6 at room temperature and about 2.4 at a higher heat-treating temperature. Accordingly, a molten rubidium chloride bath can be used with the glass fiber of the above mentioned composition.

Furthermore, as a molten substance in the salt bath, a molten glass having a sufficiently lower melting point than that of the glass fiber and containing ions having a lower degree of contribution to the refractive index in the form of an oxide, for instance, an oxide glass of a low melting point containing an alkali metal, for instance, a glass of a $B_2O_3$-PbO-ZnO-$Na_2O$ composition can be employed. In such a case, the molten glass may be left on the surface of the fiber glass thus heat-treated as a protecting coating layer.

The apparatus for producing the light-conducting glass fiber according to the present invention comprises means for continuously spinning a glass fiber containing ions having a greater degree of contribution to the refractive index, a bath containing a molten substance less contributable to the refractive index and of a specific gravity substantially equal to that of the glass fiber, means for continuously feeding the glass fiber produced in the spinning means into the bath, means for heating the bath to a high temperature at which a glass fiber being dipped in the molten substance of the bath would soften and be deformed if the specific gravity of the molten substance were different from that of the glass fiber, and means for continuously leading and conveying out of the bath the glass fiber which has been fed into the bath by the feeding means, and through the outer surface of said fiber mutual thermal diffusion between the ions having a greater contribution to the refractive index and ions having a lesser contribution to the refractive index has been caused to occur.

According to the present invention, the above described distribution of the refractive index required for the glass fiber can be obtained by a heat treatment of a substantially short period, whereby a light-conducting glass fiber of an extremely long length and having a desired distribution of the refractive index can be obtained by spinning the glass fiber continuously and by simultaneously feeding the glass fiber thus spun into the bath of the molten substance having the specified properties.

In order to facilitate further comprehension of the present invention, several embodiments of the invention will now be described.

EXAMPLE 1

A glass fiber composed, in mole percent, of 3.3% of $Tl_2O$, 17.0% of $Na_2O$, 9.4% of PbO, and 70.3% of $SiO_2$, and having a diameter of 1 mm. was treated in a bath containing a molten mixture of salts of a composition, in mole percent, of 45% of $PbCl_2$ and 55% of KCl. The temperature of the heat treatment in this example was 534° C. instead of the temperature of 460° C. for the case wherein $KNO_3$ salt is used, whereby the heat treating period required for obtaining the focusing light-conductive characteristic could be reduced from the conventional 400 hours to 18 hours. This temperature further could be raised to 608° C., and the treating period of the glass fiber was found to be shortened to only 2.3 hours. In either of these cases, a light-conducting glass fiber of about 30-cm. length having no diametric variation or bending deformation could be obtained.

The refractive index distribution in the glass fiber thus obtained was found to satisfy the above set forth equation, wherein the consant $a$ was $a=0.05$ mm.$^{-2}$ within a circle of about 0.25-mm. radius in the cross section of the glass fiber.

Furthermore, the viscosity of the glass fiber was $10^{7.8}$ poises (or log $\eta=7.8$) at the temperature of 534° C., and $10^{6.5}$ poises (or log $\eta=6.5$) at the temperature of 608° C. The specific gravity of the glass fiber was 3.5, while the specific gravity of the salt mixture was 3.3, the difference being 0.2.

EXAMPLE 2

A glass fiber composed, in wt. percent, of 58.0% of $SiO_2$, 14.0% of $Na_2O$, 19.0% of $Tl_2O$, 6.0% of $K_2O$, 1.0% of $Al_2O_3$, and 2.0% of MgO and having a diameter of 1 mm. was heat-treated in a bath containing a molten mixture of salts composed in mole percent, of 65% of $BaNO_3$ and 35% of $KNO_3$. The heat-treating temperature was raised to 530° C., whereupon a light-conducting glass fiber of about 30-cm. length and having no deformation was obtained after 15 hours of treatment.

The distribution of the refractive index in the glass fiber thus obtained was found to satisfy the above set forth equation, wherein the constant $a$ was $a=0.08$ mm.$^{-2}$ within a central circular portion having a radius of 0.3 mm.

Furthermore, the specific gravity of the glass fiber was 2.8, while the specific gravity of the salt mixture was 2.7, the difference being 0.1.

EXAMPLE 3

As shown in the figure of the accompanying drawing, a glass bar composed, in mole percent, of 3.3% $Tl_2O$, 17% $Na_2O$, 9.4% PbO, and 70.3% $SiO_2$ having a diameter of 15 mm. was fed into a heating furnace 3 maintained at a temperature of 650° C. by means of a feeding device 9 at a feeding speed of 0.90 mm./min., and a glass fiber 2 of 0.5-mm. diameter was spun by means of spinning rollers 6 at a spinning speed of 77 cm./min. The glass fiber thus obtained was thereafter fed through a plurality of feeding rollers 10, 7, and 11 into a heating furnace 4.

The heating furnace 4, contained therein a bath of a salt mixture 5 of a composition, in mole percent, of 31.0% of $PbSO_4$, 31.0% of $Li_2SO_4$, 16.0% of $Na_2SO_4$, and 22.0% of $K_2SO_4$, which salt mixture 5 was maintained at a temperature of about 700° C. The viscosity of the glass fiber passing through the bath of the salt mixture 5 was about $10^{5.3}$ poises, and the specific gravity of the glass fiber was about 3.5. Furthermore, the specific gravity of the salt mixture 5 maintained at the temperature of 700° C. was about 3.3, and the difference in the specific gravities of the glass fiber and the salt mixture was about 0.2.

While the glass fiber 2 passed through the salt bath 5 of about 15-m. length requiring about 13 minutes, a mutual thermal diffusion through the surface of the glass fiber occurred between ions having a greater degree of contribution to the refractive index inside of the glass fiber, for instance, Tl ions, and ions having less contribution to the refractive index, such as Li, Na, and K ions.

The glass fiber 2 was thereafter led out of the furnace 4 by means of rollers 12, 13, 14, 15, and 8, and was cooled. The glass fiber thus produced was not deformed within the furnace 4, and a light-conducting glass fiber having a focusing characteristic due to the parabolic distribution of the refractive index was produced continuously.

The distribution of the refractive index in a cross section of the glass fiber thus obtained was found to satisfy the above set forth equation, wherein the constant $a$ was $a=0.2$ mm.$^{-2}$ within a central circular portion having a radius of 25 microns.

Glass fibers having a composition as specified above and respective diameters of 0.25 mm., 0.5 mm. and 1.0 mm. were dipped into the above-mentioned bath of salt mixture maintained at 660° C., in one instance and 800° C. in another, and, focusing light-conducting fibers having the above-mentioned diameters were obtained. The required periods for the heat treatment, were as indicated in the following Table 1.

TABLE 1

| Temperature (° C.) | Diameter of glass fiber (mm.) | Required period for heat treatment (min.) |
| --- | --- | --- |
| 660 | 0.25 | 4.5 |
| 660 | 0.5 | 18 |
| 660 | 1.0 | 72 |
| 800 | 1.0 | 15 |

On the other hand, the optimum spinning speed for a glass fiber having the above-mentioned diameter, in the case where the outer diameter of the original glass bar is 15 mm. and the spinning temperature is 650° C., was found to be 300 cm./min. for the glass fiber of 0.5 mm. diameter, and 600 cm./min. for the glass fiber of 0.25 mm. diameter.

The length of the salt bath placed in the furnace, required for rendering a sufficient mutual thermal diffusion of ions, calculated from the above-mentioned spinning speed shown in Table 1 are indicated in the following Table 2.

TABLE 2

| | Length of salt bath required for producing glass fiber of 0.5 mm. diam. (m.) | | Length of salt bath required for producing glass fiber of 0.25 mm. diam. (m.) | |
| --- | --- | --- | --- | --- |
| Spinning speed of glass fiber (cm./min.) | Treating temperature 660° C. | Treating temperature 800° C. | Treating temperature 660° C. | Treating temperature 800° C. |
| 300 | 54 | 12 | | |
| 600 | | | 27 | 6 |

As is apparent from the valves indicated in Table 2, by selecting a suitable spinning speed and a heat-treating temperature, a continuous production of the glass fiber can be accomplished through the provision of a salt bath having a length of 12 m. for a glass fiber of 0.5-mm. outer diameter and a length of 6 m. for a glass fiber of 0.25-mm. outer diameter.

Although the invention has been described with respect to an example wherein the glass fiber is spun from a glass bar material, it is of course possible to employ a molten glass material included in a pot which is drawn out of a nozzle provided on the lower portion of the pot into the glass fiber. Furthermore, a glass fiber once spun may be wound beforehand on a winding drum and thereafter passed through the molten bath at a speed different those indicated in the table.

What is claimed is:

1. A method for producing an elongated light-conducting glass structure comprising a glass body having a centrally located axis, an entrance surface and an exit surface, each transverse to said axis and a side surface surrounding said axis, said glass body having a gradient of refractive indices along planes transverse to said axis, the gradient of said indices within said body decreasing substantially in proportion to the square of the radial distance from said axis, which comprises (A) providing a glass body of a glass having a uniform, high refractive index containing uniformly distributed therethrough first ions of thallium, highly contributable to the refractive index of the glass of said body, (B) introducing said glass body into a liquid molten salt bath mixture containing second ions, less contributable to the refractive index of said body selected from the group consisting of the alkali metal ions, lithium, sodium, potassium, rubidium, and cesium, said first and said ions being mutually ion-exchangeable in said glass, (C) adjusting said bath composition of molten materials to a specific gravity differing from the specific gravity of said glass body by less than 0.4, at bath temperatures, (D) floating said glass body in complete submergence in said bath under tension-free conditions, (E) heat treating said glass body by maintaining said bath of molten materials at temperatures higher than the temperature at which the viscosity of the glass comprising said glass body is $10^{10}$ poises, (F) maintaining said glass body in said bath at said temperature for a time sufficient for the diffusion of said thallium ions from said glass body to said bath and said second ions from said bath to said body, to alter by diffusion the uniform distribution in said body of said first ions and to provide a nonuniform refractive index gradient in the plane of said glass body transverse to said axis whereby the refractive index in said transverse plane decreases in proportion to the square of the radial distance from the axis, at least in a portion of said glass body near said axis, and (G) withdrawing the treated glass body at a rate whereby said glass body is maintained in substantially uniform cross-section and said transverse refractive index gradient is maintained substantially uniform along the axis of said body.

2. A process as set forth in claim 1 wherein said bath comprises a molten mixture of an alkali metal salt and at least one salt or oxide selected from the group of density adjusting salts consisting of salts and oxides of alkali metals, alkaline-earth metals, lead and zinc.

3. A process as set forth in claim 2 wherein said mixture is a member selected from the group consisting of $PbCl_2+KCl$; $PbCl_2+KCl+ZnCl_2+PbCl_2+LiCl$
$KCl+ZnCl_2$; $KCl+PbCl_2+K_2SO_4+PbSO_4$; and
$KNO_3+BaNO_3$.

4. A process as set forth in claim 1 wherein the glass body to be provided containing said first ions is continuously prepared by feeding a glass rod, starting from one end thereof, at a constant feeding speed into a heating furnace, and drawing said end of the glass rod at a greater speed than said feeding speed; and said introduction step is carried out by introducing the glass body so-drawn into said bath at a speed equal to that of said drawing speed.

5. A process as set forth in claim 1 wherein the glass body to be provided containing said first ions is continuously prepared by storing a molten glass uniformly containing said first ions in a pot and drawing the molten glass from the pot through a nozzle and said introduction is carried out by introducing the drawn glass body into the molten salt at a speed equal to that of said drawing of the molten glass.

6. The process according to claim 1 wherein the glass body is continuously introduced into one end of said bath is passed through said bath buoyantly supported below the surface of said bath in tension-free condition in a non-vertical direction and is continuously removed from said bath upon completion of said heat treatment, whereby the desired refractive index gradient is obtained.

(References on following page)

References Cited

UNITED STATES PATENTS

| | | | |
|---|---|---|---|
| 3,628,934 | 12/1971 | Duthoit et al. | 65—30 X |
| 3,589,878 | 6/1971 | Acheher | 65—30 X |
| 2,992,517 | 7/1961 | Hicks, Jr. | 65—4 |
| 3,146,082 | 8/1964 | Hicks, Jr. et al. | 65—61 X |
| 3,582,297 | 6/1971 | Lakeman | 65—4 |
| 3,320,114 | 5/1967 | Schulz | 65—30 X |
| 3,395,994 | 8/1968 | Cuff | 65—30 X |
| 3,248,193 | 4/1966 | Hohmann | 65—32 |
| 3,375,155 | 3/1968 | Adams | 65—30 |
| 3,486,808 | 12/1969 | Hamblen | 65—30 X |
| 3,083,123 | 3/1963 | Navias | 65—Dig. 7 |
| 3,589,793 | 6/1971 | Curtis | 65—Dig. 7 |

FRANK W. MIGA, Primary Examiner

U.S. Cl. X.R.

65—3, 32, 182 R, Dig. 7